March 22, 1960  P. S. VOSBIKIAN ET AL  2,929,141
LOCKING AND BIASING MECHANISM FOR BLADED TOOLS HAVING
PIVOTALLY CONNECTED HANDLES
Filed Oct. 10, 1958
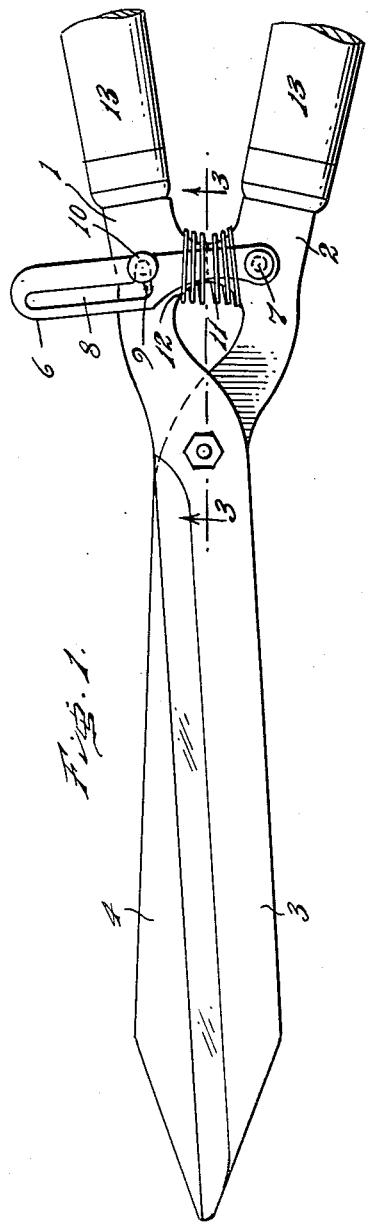
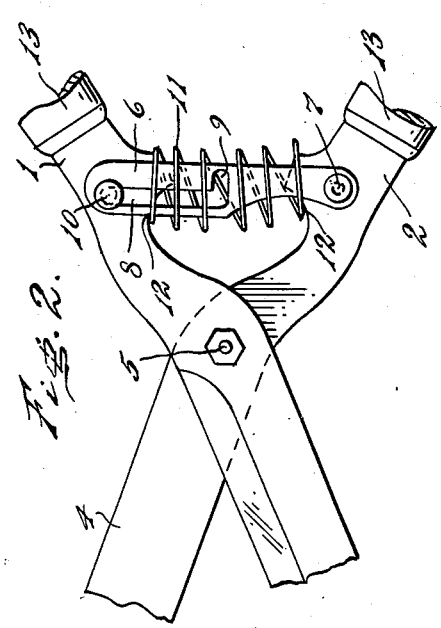
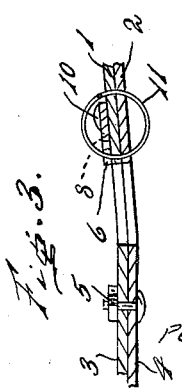
INVENTOR
Peter S. Vosbikian
Thomas S. Vosbikian
BY
Herbert S. Fairbanks
ATTORNEY United States Patent Office 2,929,141
Patented Mar. 22, 1960

2,929,141

LOCKING AND BIASING MECHANISM FOR BLADED TOOLS HAVING PIVOTALLY CONNECTED HANDLES

Peter S. Vosbikian and Thomas S. Vosbikian, Melrose, Pa.

Application October 10, 1958, Serial No. 766,440

2 Claims. (Cl. 30—261)

The object of this invention is to devise novel locking and biasing mechanism for the handles of bladed tools.

A further object is to devise mechanism of this character which can be economically fabricated and which can be assembled without the aid of special tools.

A further object is to devise a locking and biasing mechanism having a slotted member pivotally mounted on one handle and extending transversely across the other handle with a coil spring loosely mounted on the member and having no fixed connection with the member or handles.

Other novel features of construction will hereinafter appear in the detailed description and the appended claims.

For the purpose of illustrating the invention, we have shown in the accompanying drawings a preferred embodiment of it which we have found in practice to give satisfactory and reliable results. It is, however, to be understood that the various instrumentalities of which the invention consists can be variously arranged and organized and the invention is not limited, except by the scope of the appended claims to the exact arrangement and organization of these instrumentalities as herein set forth.

Figure 1 is a plan view of locking and biasing mechanism for the handles of bladed tools with the handles and blades in locked condition.

Figure 2 is a plan view of a bladed tool with parts in unlocked and open condition.

Figure 3 is a section on line 3—3 of Figure 1.

Similar numerals of reference indicate corresponding parts.

Referring to the drawings:

The bladed tool as shown has handles 1 and 2, the handle 1 being preferably integral with a blade 3 and the handle 2 being preferably integral with a blade 4.

The blades may be of any desired form or construction in accordance with the work which is to be done, for example cutting or gripping the material, and for purpose of illustration are shown as hedge shear blades.

The handles are connected by a pivot 5.

In order to provide for locking the handles and blades in their closed condition and for biasing them for their opening movement, we employ a locking and releasing member 6 in the form of a substantially flat strip of material having its inner end mounted on the handle 2 by a pivot 7. The member 6 has a longitudinally extending slot 8, the inner and outer ends of which are closed, and near the inner end of the slot a recess 9 is provided in a side wall to receive a locking member 10 in the form of a pin fixed to the handle 1 and having a head which overlies the sides of the slot 6. When the member 6 is in its unlocked condition, the opening movement of the handles and blades is limited by the contacting of the pin 10 with the outer closed end of the slot 6.

The opening movement of the handles and blades is caused by a coil spring 11 mounted on the member 6 and having no fixed connection with the member 6 or the handles, and with the free ends of the spring abutting against shoulders 12 on the handles.

The shanks of the handles have plastic or other sleeves secured to them to form grasping handles.

The operation of the locking and biasing mechanism is as follows:

When the handles and blades are in their closed positions as in Figure 1 and the member 6 is moved rearwardly, the pin 10 is locked in the recess 9 and the spring 11 is compressed between the handles.

If the operator swings the member 6 rearwardly, the pin is released from its recess, and the spring expands to cause the opening movements of the handles and blades.

Having thus described our invention, what we claim as new and desire to secure by Letters Patent is:

1. Locking and releasing mechanism for bladed tools having pivoted handles, comprising blades and handles with the handles pivoted together, a locking member having one end pivoted on one handle and extending transversely across the other handle, said member having a longitudinally extending slot closed at its inner and outer end with a recess communicating with the slot at the inner end of the slot, a pin on the other handle for locking engagement with the walls of said recess and extending through said slot, and a coil spring freely slidable on said member and having its ends in abutting relationship with said handles.

2. The construction defined in claim 1, wherein said member is wider at the slot portion to form a straight line bearing for sliding movement of an end portion of the spring.

References Cited in the file of this patent

UNITED STATES PATENTS

| | | |
|---|---|---|
| 1,827,149 | Heimerdinger | Oct. 13, 1931 |
| 2,589,727 | Porter | Mar. 18, 1952 |